(12) United States Patent
Khatun et al.

(10) Patent No.: US 11,003,825 B1
(45) Date of Patent: May 11, 2021

(54) SYSTEM, METHOD, AND COMPUTER PROGRAM PRODUCT FOR OPTIMIZATION IN AN ELECTRONIC DESIGN

(71) Applicant: Cadence Design Systems, Inc., San Jose, CA (US)

(72) Inventors: Saleha Khatun, San Jose, CA (US); Sheng Qian, Sunnyvale, CA (US); Wangyang Zhang, Allison Park, PA (US); Elias Lee Fallon, Allison Park, PA (US)

(73) Assignee: Cadence Design Systems, Inc., San Jose, CA (US)

( * ) Notice: Subject to any disclaimer, the term of this patent is extended or adjusted under 35 U.S.C. 154(b) by 0 days.

(21) Appl. No.: 16/583,643

(22) Filed: Sep. 26, 2019

(51) Int. Cl.
*G06F 30/30* (2020.01)
*G06F 30/38* (2020.01)
*G06F 30/392* (2020.01)
*G06F 30/398* (2020.01)
*G06F 111/06* (2020.01)

(52) U.S. Cl.
CPC .............. *G06F 30/38* (2020.01); *G06F 30/30* (2020.01); *G06F 30/392* (2020.01); *G06F 30/398* (2020.01); *G06F 2111/06* (2020.01)

(58) Field of Classification Search
None
See application file for complete search history.

(56) References Cited

U.S. PATENT DOCUMENTS

| | | | | |
|---|---|---|---|---|
| 7,103,524 | B1* | 9/2006 | Teig | G06F 30/398 703/14 |
| 8,117,139 | B2* | 2/2012 | Bonabeau | G06N 3/126 706/13 |
| 10,275,719 | B2* | 4/2019 | Talathi | G06N 20/00 |
| 10,699,051 | B1* | 6/2020 | Zhang | G06N 20/00 |
| 2014/0358831 | A1* | 12/2014 | Adams | G06N 20/00 706/12 |
| 2019/0325108 | A1* | 10/2019 | Turek | G06N 3/04 |
| 2020/0104715 | A1* | 4/2020 | Denolf | G06N 3/0445 |
| 2020/0143252 | A1* | 5/2020 | Dasgupta | G06N 3/084 |
| 2020/0202171 | A1* | 6/2020 | Hughes | G06K 9/6264 |
| 2020/0226496 | A1* | 7/2020 | Basu | G06N 7/005 |

OTHER PUBLICATIONS

S. Pandit et al., "Systematic Methodology for High-Level Performance Modeling of Analog Systems," 2009 22nd Int'l Conference on VLSI Design, IEEE Computer Society, pp. 361-366. (Year: 2009).*

(Continued)

*Primary Examiner* — Leigh M Garbowski
(74) *Attorney, Agent, or Firm* — Mark H. Whittenberger, Esq.; Holland & Knight LLP

(57) ABSTRACT

The present disclosure relates to a computer-implemented method for electronic design is provided. Embodiments may include receiving, using at least one processor, an electronic design and determining an objective function associated with the electronic design. Embodiments may further include optimizing the objective function using Bayesian optimization and generating a best hyper-parameter setting based upon, at least in part, the Bayesian optimization.

15 Claims, 10 Drawing Sheets

(56) References Cited

OTHER PUBLICATIONS

X. Li et al., "Bayesian Model Fusion: A Statistical Framework for Efficient Pre-Silicon Validation and Post-Silicon Tuning of Complex Analog and Mixed-Signal Circuits," 2013 IEEE, pp. 795-802. (Year: 2013).*

Q. Huang et al., "Efficient Performance Modeling via Dual-Prior Bayesian Model Fusion for Analog and Mixed-Signal Circuits," ACM DAC 2016, 6 pages. (Year: 2016).*

E. Dumesnil et al., "Fuly parallel FPGA Implementation of an Artificial Neural Network Tuned by Genetic Algorithm," 2018 IEEE, pp. 365-369. (Year: 2018).*

P.I. Frazier, "A Tutorial on Bayesian Optimization," Cornell University, arXiv.org, Jul. 8, 2018, pp. 1-22. (Year: 2018).*

W. Lyu et al., "Multi-objective Bayesian Optimization for Analog/RF Circuit Synthesis," 2018 ACM/DAC, 6 pages. (Year: 2018).*

M.S. Saleh et al., "Parametric Fault Detection of Analogue Circuits Based on Optimized Support Vector Machine Classifier," 2018 14th Int'l Computer Engineering Conference (ICENCO), 9 pages. (Year: 2018).*

Y. Zhang et al., "Cut Redistribution and Insertion for Advanced 1-D Layout Design via Network Flow Optimization," IEEE Trans. on Very Large Scale Integration (VLSI) Systems, vol. 26, No. 9, Sep. 2018, pp. 1613-1626. (Year: 2018).*

S. Zhang et al., "An Efficient Multi-fidelity Bayesian Optimization Approach for Analog Circuit Synthesis," ACM DAC 2019, 6 pages. (Year: 2019).*

M.S. Saleh et al., "Parametric Fault Detection of Analogue Circuits Based on Optimized Support Vector Machine Classifier," 2018 14th Int'; Computer Engineering Conference (ICENCO), 6 pages. (Year: 2019).*

P. Zhou et al., "A Novel OLS Algorithm for Training RBF Neural Networks with Automatic Model Selection," 2010 Int'l Conference on Computer Application and System Modeling (ICCASM 2010), pp. 40-44. (Year: 2010).*

L. Wang et al., "Spectrum-Based Kernel Length Estimation for Gaussian Process Classification," IEEE Trans. om Cybernetics, vol. 44, No. 6, Jun. 2014, pp. 805-815. (Year: 2014).*

* cited by examiner

SYSTEM, METHOD, AND COMPUTER PROGRAM PRODUCT FOR OPTIMIZATION IN AN ELECTRONIC DESIGN

GOVERNMENT RIGHTS

This invention was made with Government support under Agreement No. HR0011-18-3-0010, awarded by DARPA. The Government has certain rights in the invention.

FIELD OF THE INVENTION

The present disclosure relates to electronic circuit design, and more specifically, to Bayesian optimization in electronic designs.

DISCUSSION OF THE RELATED ART

Hyper-parameter analysis for an algorithm requires significant computation as it may involve experimentation by running a series of tests against the validation set while varying the hyper-parameters at each test, and finding the corresponding performance. An optimal hyper-parameter is chosen based on the best performance against the validation set. Since the validation set is independent from the training set, and meant specifically for performance improvement, this is a valid means of selecting all the hyper-parameters of a algorithm requires significant computation. However this is a time-consuming task and may require some guesswork.

SUMMARY

In one or more embodiments of the present disclosure, a computer-implemented method for electronic design is provided. The method may include receiving, using at least one processor, an electronic design and determining an objective function associated with the electronic design. The method may further include optimizing the objective function using Bayesian optimization and generating a best hyper-parameter setting based upon, at least in part, the Bayesian optimization.

One or more of the following features may be included. In some embodiments, the Bayesian optimization may include selecting a kernel from one or more available kernels of a Gaussian model. Selecting may be based upon, at least in part, observing a pre-sample fitting performance in the kernel. The method may include selecting one or more samples from a uniform distribution and applying an acquisition function to select a best sample. The method may further include identifying one or more best points to generate one or more exploitation centers. The method may also include defining a Gaussian distribution associated with the one or more exploitation centers. The method may further include applying the Gaussian distribution and an acquisition function to obtain the best hyper-parameter setting. The method may include using the best hyper-parameter setting to train a model and/or using the best hyper-parameter setting to determine an analog device placement.

In yet another embodiment of the present disclosure a non-transitory computer readable medium having stored thereon instructions that when executed by a processor result in one or more operations is included. Operations may include receiving, using at least one processor, an electronic design and determining an objective function associated with the electronic design. Operations may further include optimizing the objective function using Bayesian optimization and generating a best hyper-parameter setting based upon, at least in part, the Bayesian optimization.

One or more of the following features may be included. In some embodiments, the Bayesian optimization may include selecting a kernel from one or more available kernels of a Gaussian model. Selecting may be based upon, at least in part, observing a pre-sample fitting performance in the kernel. Operations may include selecting one or more samples from a uniform distribution and applying an acquisition function to select a best sample. Operations may further include identifying one or more best points to generate one or more exploitation centers. Operations may also include defining a Gaussian distribution associated with the one or more exploitation centers. Operations may further include applying the Gaussian distribution and an acquisition function to obtain the best hyper-parameter setting. Operations may include using the best hyper-parameter setting to train a model and/or using the best hyper-parameter setting to determine an analog device placement.

In one or more embodiments of the present disclosure, a system for electronic design is provided. The system may include a computing device having at least one processor configured to perform one or more operations. Operations may include receiving, using at least one processor, an electronic design and determining an objective function associated with the electronic design. Operations may further include optimizing the objective function using Bayesian optimization and generating a best hyper-parameter setting based upon, at least in part, the Bayesian optimization.

One or more of the following features may be included. In some embodiments, the Bayesian optimization may include selecting a kernel from one or more available kernels of a Gaussian model.

Additional features and advantages of embodiments of the present disclosure will be set forth in the description which follows, and in part will be apparent from the description, or may be learned by practice of embodiments of the present disclosure. The objectives and other advantages of the embodiments of the present disclosure may be realized and attained by the structure particularly pointed out in the written description and claims hereof as well as the appended drawings.

It is to be understood that both the foregoing general description and the following detailed description are exemplary and explanatory and are intended to provide further explanation of embodiments of the invention as claimed.

BRIEF DESCRIPTION OF THE DRAWINGS

The accompanying drawings, which are included to provide a further understanding of embodiments of the present disclosure and are incorporated in and constitute a part of this specification, illustrate embodiments of the present disclosure and together with the description serve to explain the principles of embodiments of the present disclosure.

DETAILED DESCRIPTION

Figure 1:
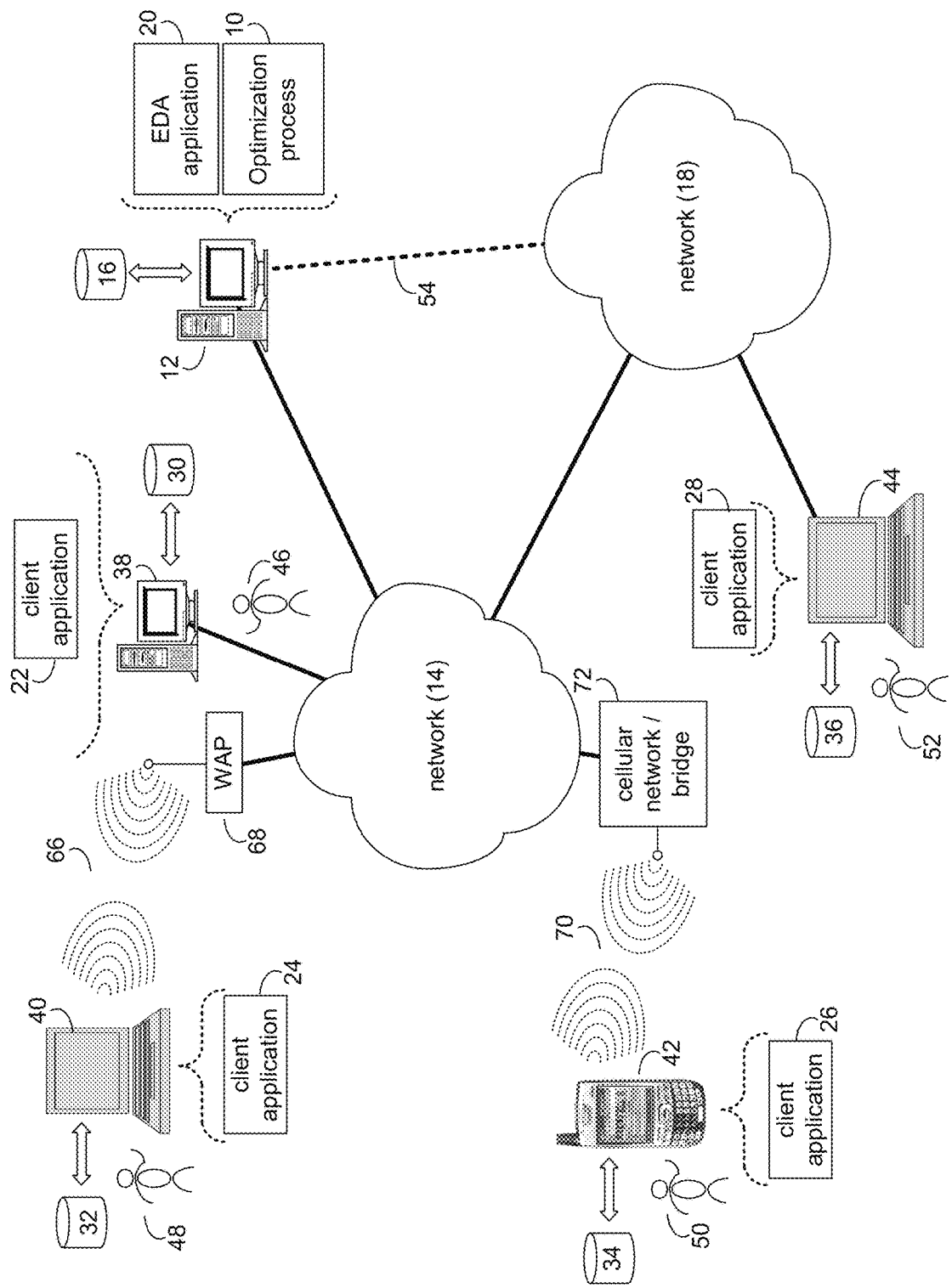
FIG. 1 is a diagram depicting an embodiment of a system in accordance with the present disclosure.

Reference will now be made in detail to the embodiments of the present disclosure, examples of which are illustrated in the accompanying drawings. The present disclosure may, however, be embodied in many different forms and should not be construed as being limited to the embodiments set forth herein. Rather, these embodiments are provided so that this disclosure will be thorough and complete, and will fully convey the concept of the disclosure to those skilled in the art.

As will be appreciated by one skilled in the art, the present disclosure may be embodied as a method, system, or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

As used in any embodiment described herein, "circuitry" may include, for example, singly or in any combination, hardwired circuitry, programmable circuitry, state machine circuitry, and/or firmware that stores instructions executed by programmable circuitry. It should be understood at the outset that any of the operations and/or operative components described in any embodiment herein may be implemented in software, firmware, hardwired circuitry and/or any combination thereof.

Any suitable computer usable or computer readable medium may be utilized. The computer readable medium may be a computer readable signal medium or a computer readable storage medium. A computer-usable, or computer-readable, storage medium (including a storage device associated with a computing device or client electronic device) may be, for example, but not limited to, an electronic, magnetic, optical, electromagnetic, infrared, or semiconductor system, apparatus, or device, or any suitable combination of the foregoing. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device. In the context of this document, a computer-usable, or computer-readable, storage medium may be any tangible medium that can contain, or store a program for use by or in connection with the instruction execution system, apparatus, or device.

A computer readable signal medium may include a propagated data signal with computer readable program coded embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

One or more hardware description languages may be used in accordance with the present disclosures. Some hardware description languages may include, but are not limited to, Verilog, VHDL, and Verilog-AMS. Various other hardware description languages may also be used as well.

Referring to FIG. 1, there is shown optimization process 10 that may reside on and may be executed by server computer 12, which may be connected to network 14 (e.g., the Internet or a local area network). Examples of server computer 12 may include, but are not limited to: a personal computer, a server computer, a series of server computers, a mini computer, and a mainframe computer. Server computer 12 may be a web server (or a series of servers) running a network operating system, examples of which may include but are not limited to: Microsoft® Windows® Server; Novell® NetWare®; or Red Hat® Linux®, for example. (Microsoft and Windows are registered trademarks of Microsoft Corporation in the United States, other countries or both; Novell and NetWare are registered trademarks of Novell Corporation in the United States, other countries or both; Red Hat is a registered trademark of Red Hat Corporation in the United States, other countries or both; and Linux is a registered trademark of Linus Torvalds in the United States, other countries or both.) Additionally/alternatively, process 10 may reside on and be executed, in whole or in part, by a client electronic device, such as a personal computer, notebook computer, personal digital assistant, or the like.

The instruction sets and subroutines of optimization process 10, which may include one or more software modules, and which may be stored on storage device 16 coupled to server computer 12, may be executed by one or more processors (not shown) and one or more memory modules (not shown) incorporated into server computer 12. Storage device 16 may include but is not limited to: a hard disk drive; a solid state drive, a tape drive; an optical drive; a RAID array; a random access memory (RAM); and a read-only memory (ROM). Storage device 16 may include various types of files and file types including but not limited, to hardware description language (HDL) files, which may contain the port type descriptions and executable specifications of hardware blocks.

Server computer 12 may execute a web server application, examples of which may include but are not limited to: Microsoft IIS, Novell Webserver™, or Apache® Webserver, that allows for HTTP (e.g., HyperText Transfer Protocol) access to server computer 12 via network 14 (Webserver is a trademark of Novell Corporation in the United States, other countries, or both; and Apache is a registered trademark of Apache Software Foundation in the United States, other countries, or both). Network 14 may be connected to one or more secondary networks (e.g., network 18), examples of which may include but are not limited to: a local area network; a wide area network; or an intranet, for example.

Server computer 12 may execute an electronic design automation (EDA) application (e.g., EDA application 20), examples of which may include, but are not limited to those available from the assignee of the present application. EDA application 20 may interact with one or more EDA client applications (e.g., EDA client applications 22, 24, 26, 28) for electronic design optimization.

Optimization process 10 may be a stand alone application, or may be an applet/application/script that may interact with and/or be executed within EDA application 20. In addition/as an alternative to being a server-side process, the optimization process may be a client-side process (not shown) that may reside on a client electronic device (described below) and may interact with an EDA client application (e.g., one or more of EDA client applications 22, 24, 26, 28). Further, the optimization process may be a hybrid server-side/client-side process that may interact with EDA application 20 and an EDA client application (e.g., one or more of client applications 22, 24, 26, 28). As such, the processes may reside, in whole, or in part, on server computer 12 and/or one or more client electronic devices.

The instruction sets and subroutines of EDA application 20, which may be stored on storage device 16 coupled to server computer 12 may be executed by one or more processors (not shown) and one or more memory modules (not shown) incorporated into server computer 12.

The instruction sets and subroutines of EDA client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory modules (not shown) incorporated into client electronic devices 38, 40, 42, 44 (respectively). Storage devices 30, 32, 34, 36 may include but are not limited to: hard disk drives; solid state drives, tape drives; optical drives; RAID arrays; random access memories (RAM); read-only memories (ROM), compact flash (CF) storage devices, secure digital (SD) storage devices, and a memory stick storage devices. Examples of client electronic devices 38, 40, 42, 44 may include, but are not limited to, personal computer 38, laptop computer 40, mobile computing device 42 (such as a smart phone, netbook, or the like), notebook computer 44, for example. Using client applications 22, 24, 26, 28, users 46, 48, 50, 52 may access EDA application 20 and may allow users to e.g., utilize optimization process 10.

Users 46, 48, 50, 52 may access EDA application 20 directly through the device on which the client application (e.g., client applications 22, 24, 26, 28) is executed, namely client electronic devices 38, 40, 42, 44, for example. Users 46, 48, 50, 52 may access EDA application 20 directly through network 14 or through secondary network 18. Further, server computer 12 (e.g., the computer that executes EDA application 20) may be connected to network 14 through secondary network 18, as illustrated with phantom link line 54. Some or all of the operations discussed herein with regard to optimization process 10 may be performed, in whole or in part, in the cloud as a cloud-based process including, for example, networks 14, 18 and any others.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 66 established between laptop computer 40 and wireless access point (e.g., WAP) 68, which is shown directly coupled to network 14. WAP 68 may be, for example, an IEEE 802.11a, 802.11b, 802.11g, Wi-Fi, and/or Bluetooth device that is capable of establishing wireless communication channel 66 between laptop computer 40 and WAP 68. Mobile computing device 42 is shown wirelessly coupled to network 14 via wireless communication channel 70 established between mobile computing device 42 and cellular network/bridge 72, which is shown directly coupled to network 14.

As is known in the art, all of the IEEE 802.11x specifications may use Ethernet protocol and carrier sense multiple access with collision avoidance (e.g., CSMA/CA) for path sharing. The various 802.11x specifications may use phase-shift keying (e.g., PSK) modulation or complementary code keying (e.g., CCK) modulation, for example. As is known in the art, Bluetooth is a telecommunications industry specification that allows e.g., mobile phones, computers, and personal digital assistants to be interconnected using a short-range wireless connection.

Client electronic devices 38, 40, 42, 44 may each execute an operating system, examples of which may include but are not limited to Microsoft Windows, Microsoft Windows CE®, Red Hat Linux, or other suitable operating system. (Windows CE is a registered trademark of Microsoft Corporation in the United States, other countries, or both.)

Figure 2:
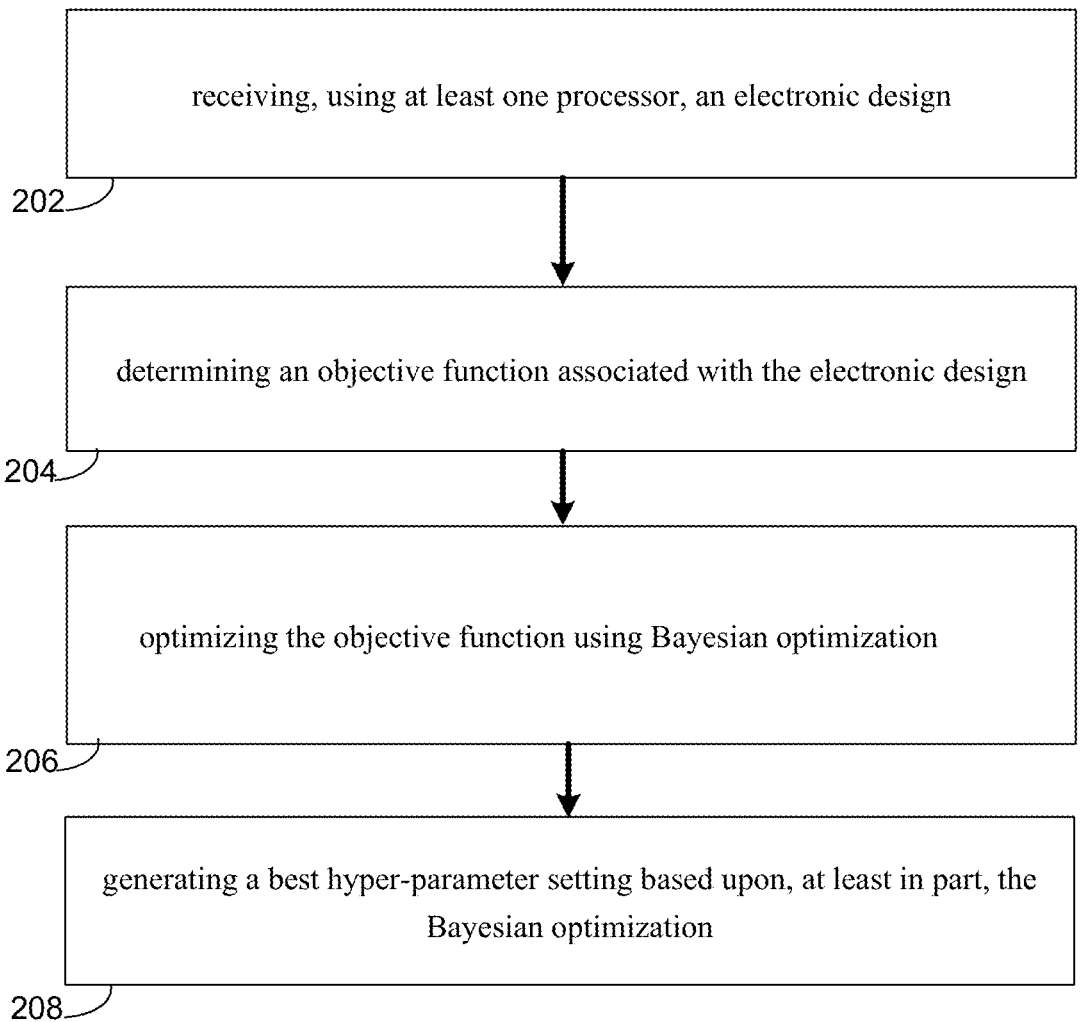
FIG. 2 is a flowchart depicting operations consistent with the optimization process in accordance with an embodiment of the present disclosure.

Referring now to FIG. 2, an example flowchart depicting operations consistent with an embodiment of optimization process 10 is provided. The process may include receiving (202), using at least one processor, an electronic design and determining (204) an objective function associated with the electronic design. Embodiments may further include optimizing (206) the objective function using Bayesian optimization and generating (208) a best hyper-parameter setting based upon, at least in part, the Bayesian optimization. Numerous other operations are also within the scope of the present disclosure.

Figure 3:
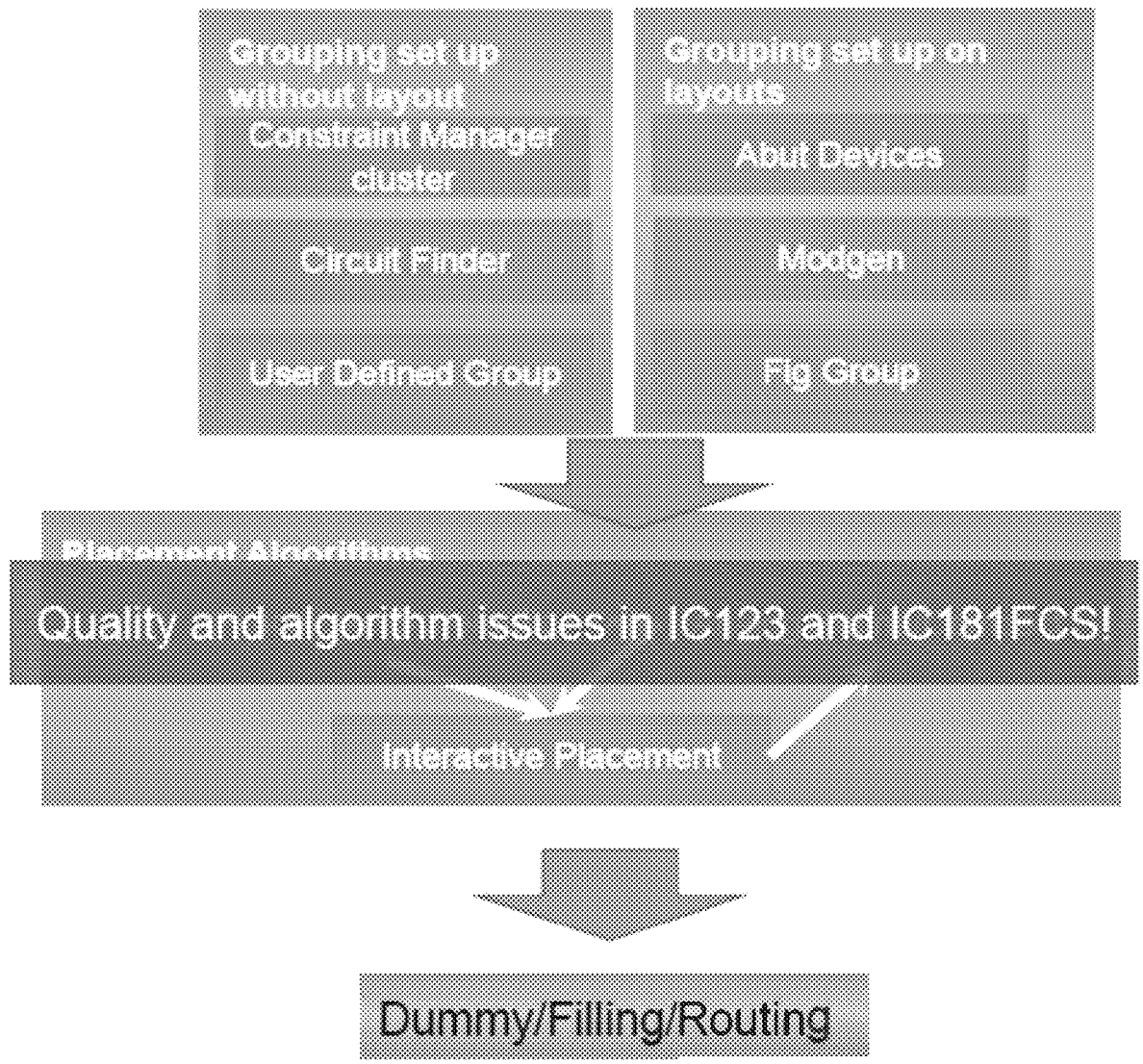
FIG. 3 is a diagram depicting a flowchart in accordance with an embodiment of the present disclosure.

Referring now to FIG. 3, a flowchart depicting example operations associated with optimization process 10 is provided. In some embodiments, structured devices may need to be grouped together in an analog and mix-signal layout. The device grouping requirements may be imported from any suitable electronic design application. Some of these may include, but are not limited to, constraint manager, module generation, circuit finder or machine learning models, etc. Users may be able to visualize and modify device grouping requirements. The group setup may be stored in a database (e.g. a layout view database, etc.) and may be shared with different algorithms. Users may execute automatic placement algorithms with assisted placement help to finish placement job.

Embodiments of optimization process 10 may include an automatic placement algorithm configured to address many of the issues discussed above. In some embodiments, the optimized placement may include a legalized layout without any design rule violations. Device grouping requirements may be input from any suitable locations such as the electronic design applications discussed above. Embodiments of optimization process 10 may operate in conjunction with row template functionality available from electronic design tools of the Assignee of the subject application, however, row template capabilities are not required.

In some embodiments, optimization process 10 may analyze one or more quality metrics such as area and wirelength, which may be used to determine the quality of placement results. Optimization process may produce one placement with minimum area and one placement with minimum wire length. Users may be provided with one or more user-selectable options to adjust the weight of area and/or wire-length for the optimization trade-off.

Figure 4:
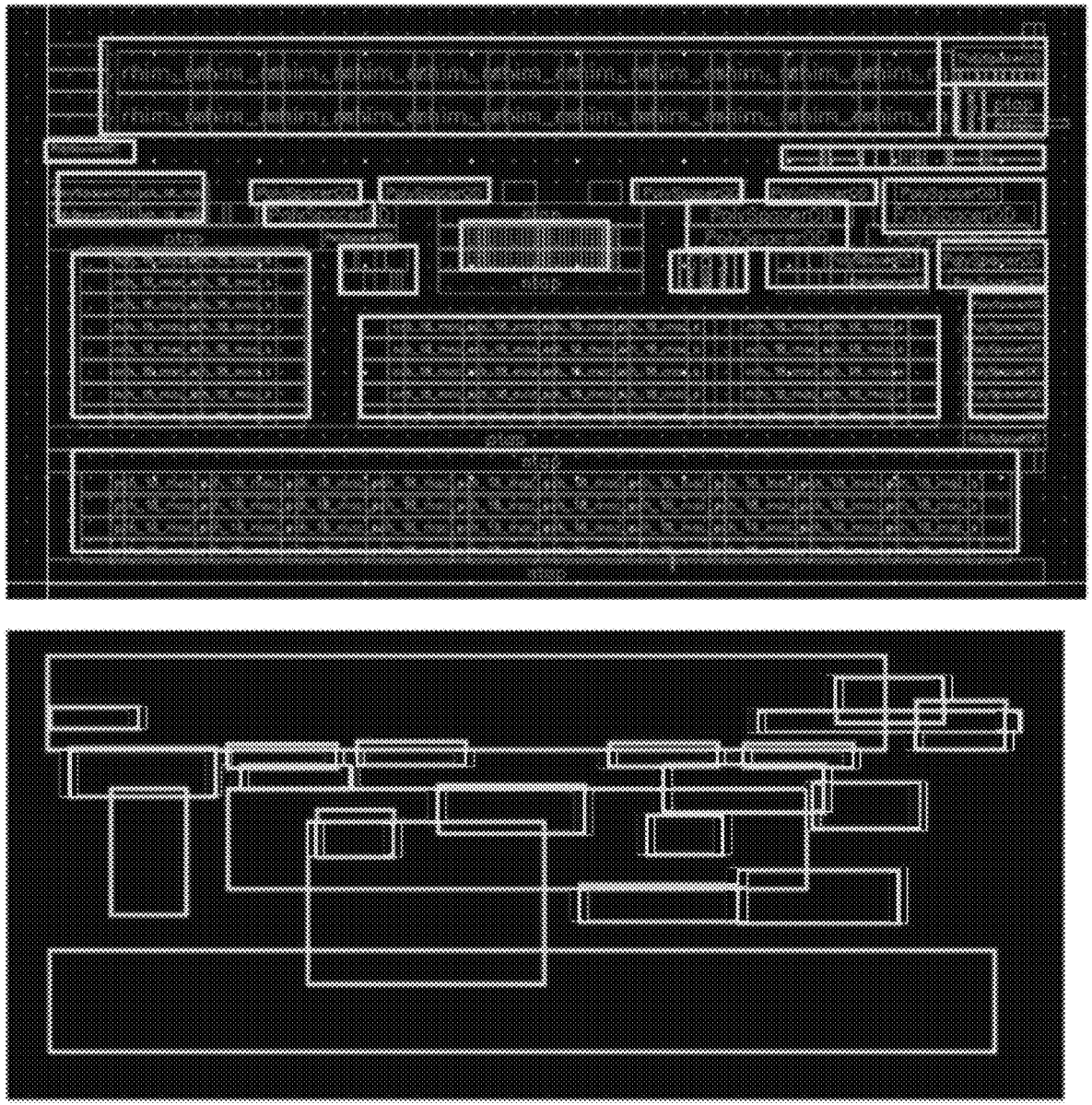
FIG. 4 is a graphical user interface in accordance with an embodiment of the present disclosure.

Referring also to FIG. 4, another graphical user interface illustrating some of the optimization challenges faced by existing approaches is provided. A row styled placement in accordance with the teachings of the present disclosure may be configured to work with or without row templates. Embodiments included herein may analyze an existing placement (e.g., schematic, layouts, .txt files, etc.) as a reference placement and optimize both instances and pins placement together during some embodiments. Moreover, some embodiments may optimize the aspect ratio of a group. Each of these concepts as well as additional genetic placement techniques are discussed in further detail in U.S. patent application Ser. No. 16/527,412, which is incorporated by reference herein in its entirety.

Figure 5:
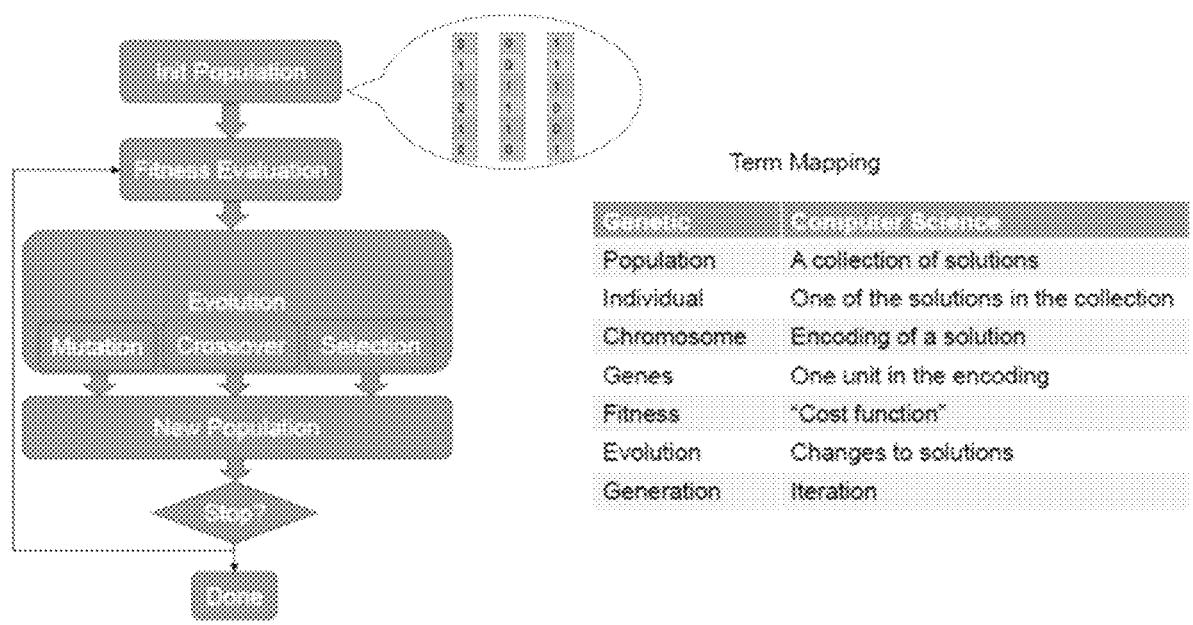
FIG. 5 is a flowchart depicting an example genetic algorithm in accordance with an embodiment of the present disclosure.

Referring now to FIG. 5, a flowchart showing an example genetic algorithm is provided. A genetic algorithm ("GA") generally refers to a bio-inspired or evolutionary algorithm that may be used for optimization and search problems. A GA may simulate the process of natural selection and evolution. The goal is to find the best "fit" individuals or those with the best genes. It should be noted that although certain embodiments included herein may reference genetic algorithms, any analysis process may be used in accordance with the teachings of the present disclosure.

Embodiments of the optimization process 10 may include a new Bayesian Optimization using a new exploitation method. For machine learning models, the training process may be configured based upon, at least in part, one or more hyper-parameters. For many EDA applications, performance may be varied with different hyper-parameter settings. Finding a good combination of hyper-parameters is a difficult and time consuming work. The Bayesian optimization approach included herein includes a self-defined cost function configured to address this problem.

An example of the EDA application is a computer-implemented method for genetic placement of analog and mix-signal circuit components. The method may include receiving, using at least one processor, an unplaced layout associated with an electronic circuit design and one or more grouping requirements. The method may also include identifying one or more instances that need to be placed in the unplaced layout and one or more areas of the unplaced layout configured to receive the one or more instances. The method may further include analyzing one or more instances that need to be placed in the unplaced layout and the one or more areas of the unplaced layout configured to receive the one or more instances, wherein analyzing is based upon, at least in part, a row-based data structure. The method may also include determining a location and an orientation for each of the one or more instances based upon, at least in part, the analyzing and generating a placed layout based upon, at least in part, the determined location and orientation for each of the one or more instances.

In some embodiments of this method, analyzing may include a cost function. Some cost types may include, but are not limited to, area, wirelength, likeness to circuit schematic, likeness to reference layout, etc. For example:

$$\text{Total cost} = W1 \times \text{AreaCost} + W2 \times \text{WirelengthCost} + W3 \times \text{Cost}_3 + \ldots + Wn \times \text{Cost}_n$$

In this particular example, users may have control of weights W1, W2, W3 to Wn. The setting of weights W1, W2, W3 to Wn is a hyper-parameters setting.

In some embodiments of this method, a genetic algorithm may be used for optimization and search problems. A genetic algorithm ("GA") generally refers to a bio-inspired or evolutionary algorithm. A GA may simulate the process of natural selection and evolution. In order to improve the performance of a GA, a hyper-parameters setting is required.

Hyper-parameters may include, but are not limited to, number of generations, number of populations, crossover rate and mutation rate.

Embodiments of the optimization process 10 may include an automatic kernel selection process. This may be configured to select the best kernel automatically by randomly sampling one or more points in the search space. Optimization process 10 may include an exploration sample strategy, which may include selecting a list of samples from a uniform distribution and using an acquisition function to select the best one from it. Optimization process 10 may also include an exploitation method configured to search near a set of best points found in the exploration step and kernel selection step by defining a Gaussian distribution around it.

In some embodiments, the Bayesian optimization approaches included herein may be applied to machine learning predictors and analog placement tools.

Figure 6:
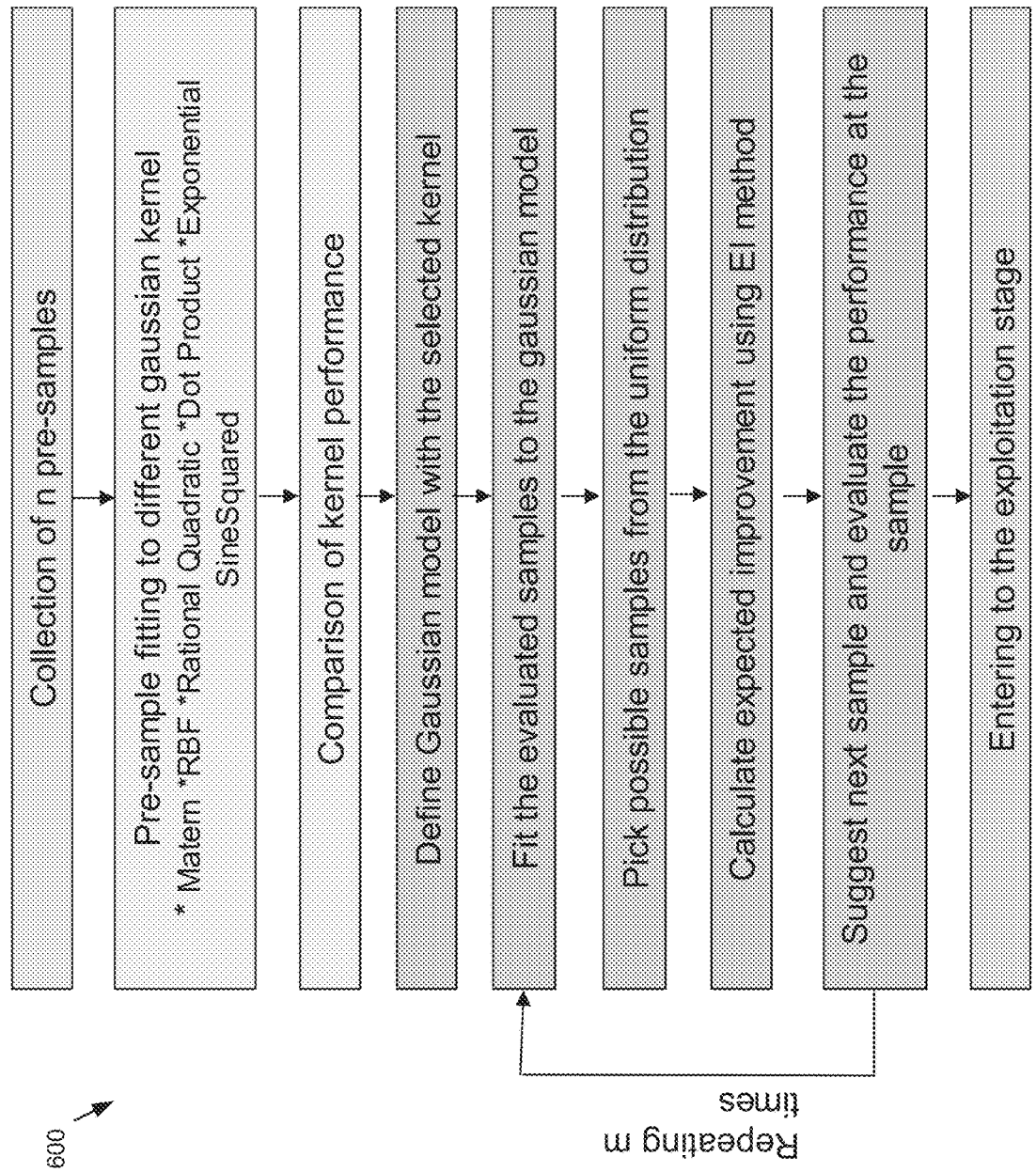
FIG. 6 is a flowchart depicting operations consistent with the optimization process in accordance with an embodiment of the present disclosure.
Figure 7:
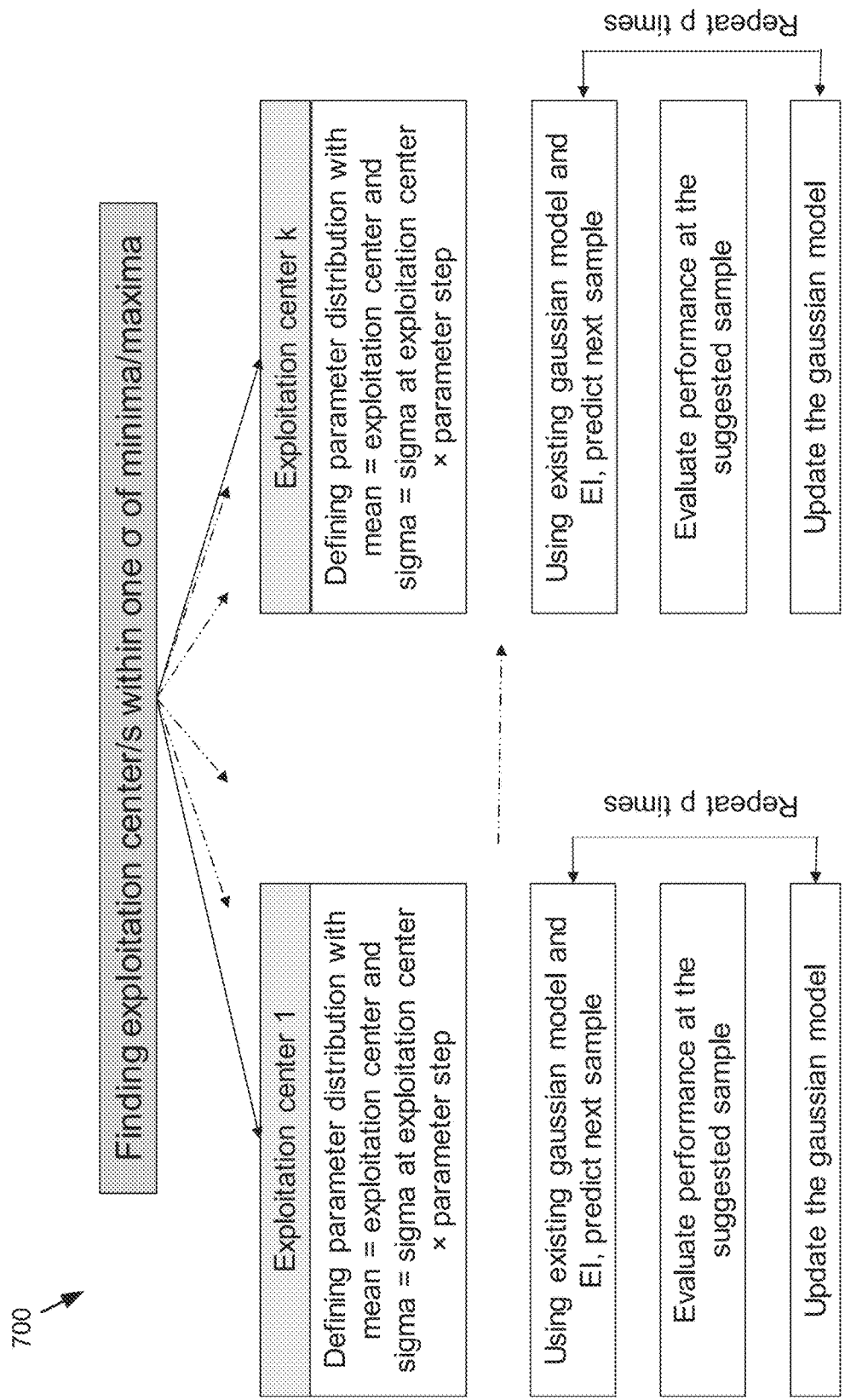
FIG. 7 is a flowchart depicting operations consistent with the optimization process in accordance with an embodiment of the present disclosure.

Referring now to FIG. 6, an example flowchart 600 showing operations consistent with embodiments of optimization process 10 is provided. This particular example shows kernel selection and exploration. The process may include a series of operation from collection of n pre-samples, defining gaussian model, to using acquisition function. The flow of the process may be as follows:

define an objective function as ObjectiveFunction(p) where p is the sample where a user is interested to evaluate the performance evaluate the objective function n times (user defined) to collect the n pre-samples define gaussian model individually with two or more available kernels to find out the best kernel based on pre-sample fitting performance take the best kernel and use the gaussian model defined by this kernel for the rest of the process fit pre-samples to the Gaussian model define the acquisition function: expected improvement, EI use EI and defined gaussian model to suggest the next sample, q to explore evaluate the ObjectiveFunction($q_i$), update the gaussian model with the newly evaluated sample, and repeat the previous three steps for i=1, . . . , m Referring now to FIG. 7, an example flowchart 700 showing operations consistent with embodiments of optimization process 10 is provided. This particular example shows an exploitation methodology. The process may include a procedure to select one or more points from all points P sampled in exploration step and kernel selection step as exploitation center(s) if the point $p_i$ satisfy the following equation:

$$\text{abs}(\text{ObjectiveFunction}(p_i) - \max(P)) \leq \text{std}(P)$$

Figure 8:
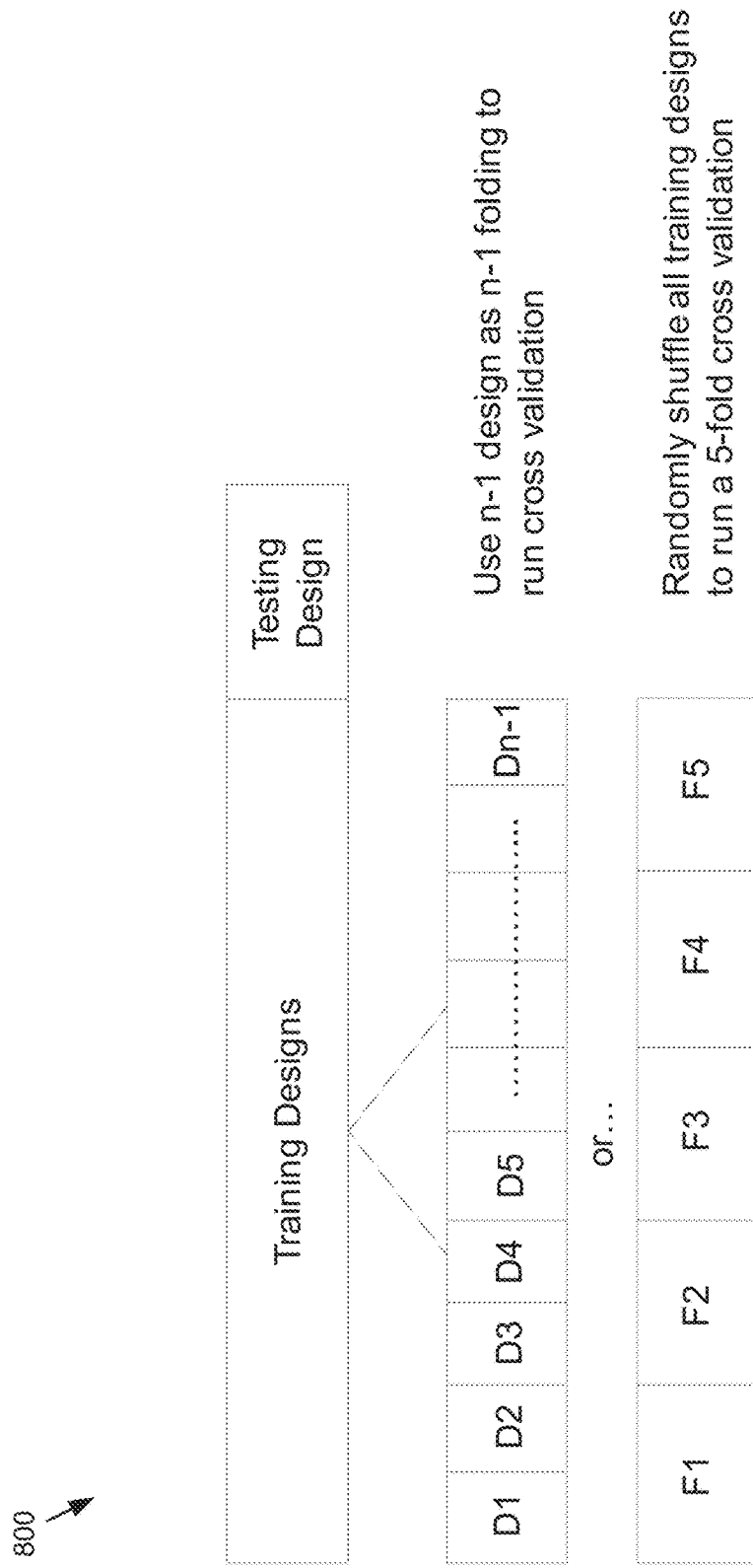
FIG. 8 is a diagram depicting a cross validation method consistent with the optimization process in accordance with an embodiment of the present disclosure.

The process may include processing each exploitation $c_i$ center by using this following procedure:
define a Gaussian distribution: $N(\mu, \sigma^2)$ where $\mu = c_i$, $\sigma = \sigma_{c_i} \times$ parameter step k repeat p times:

find $p_{next}$ by using existing Gaussian model and Expected Improvement function evaluate $p_{next}$ using $v_{next} = \text{ObjectiveFunction}(p_{next})$ update Gaussian model using $p_{next}$ and $v_{next}$ Referring now to FIG. 8, an example diagram 800 showing an example using optimization process 10 in the context of a machine learning application is provided. For machine learning applications, the performance may not be directly evaluated and, as such, a cross validation score may be maximized.

Figure 9:
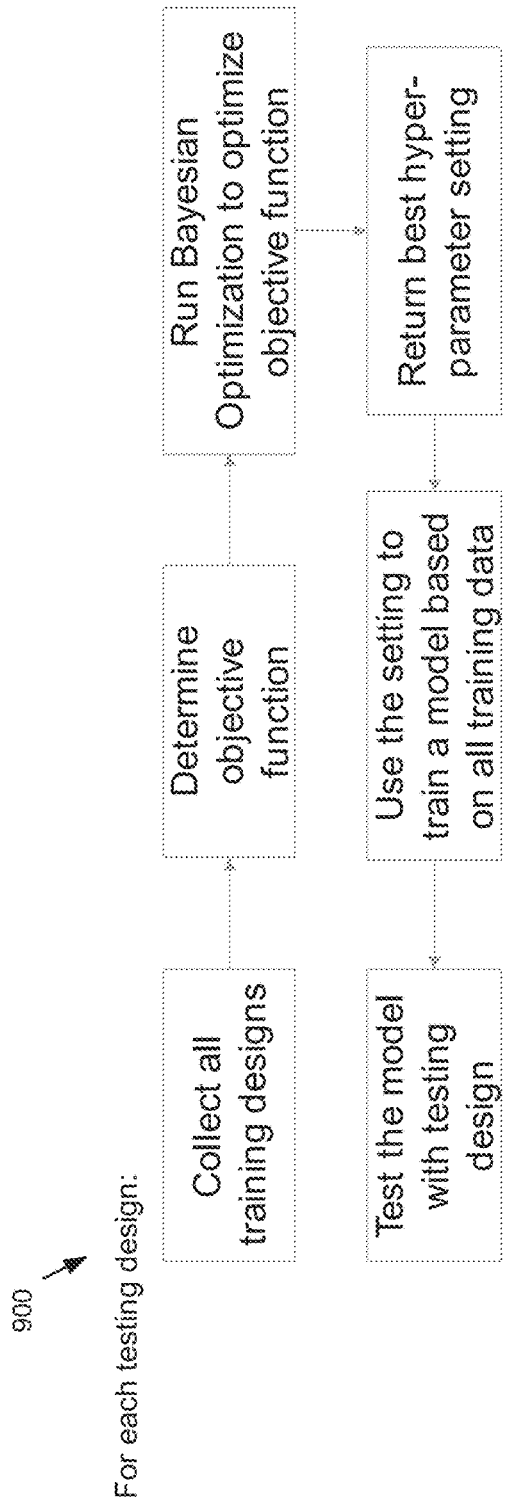
FIG. 9 is a diagram depicting an example Bayesian optimization implementation consistent with the optimization process in accordance with an embodiment of the present disclosure.

Referring now to FIG. 9 an example diagram 900 showing an example using optimization process 10 in the context of machine learning on a grouping model (e.g. Random Forest, decision tree, etc.). In operation, the process may include collecting one or more training designs and determining an objective function. The process may be configured to run Bayesian optimization to optimize the objective function and return the best or optimal hyper-parameter setting. The setting may then be used to train a model based on all of the training data. The model may then be tested with a testing design.

Figure 10:
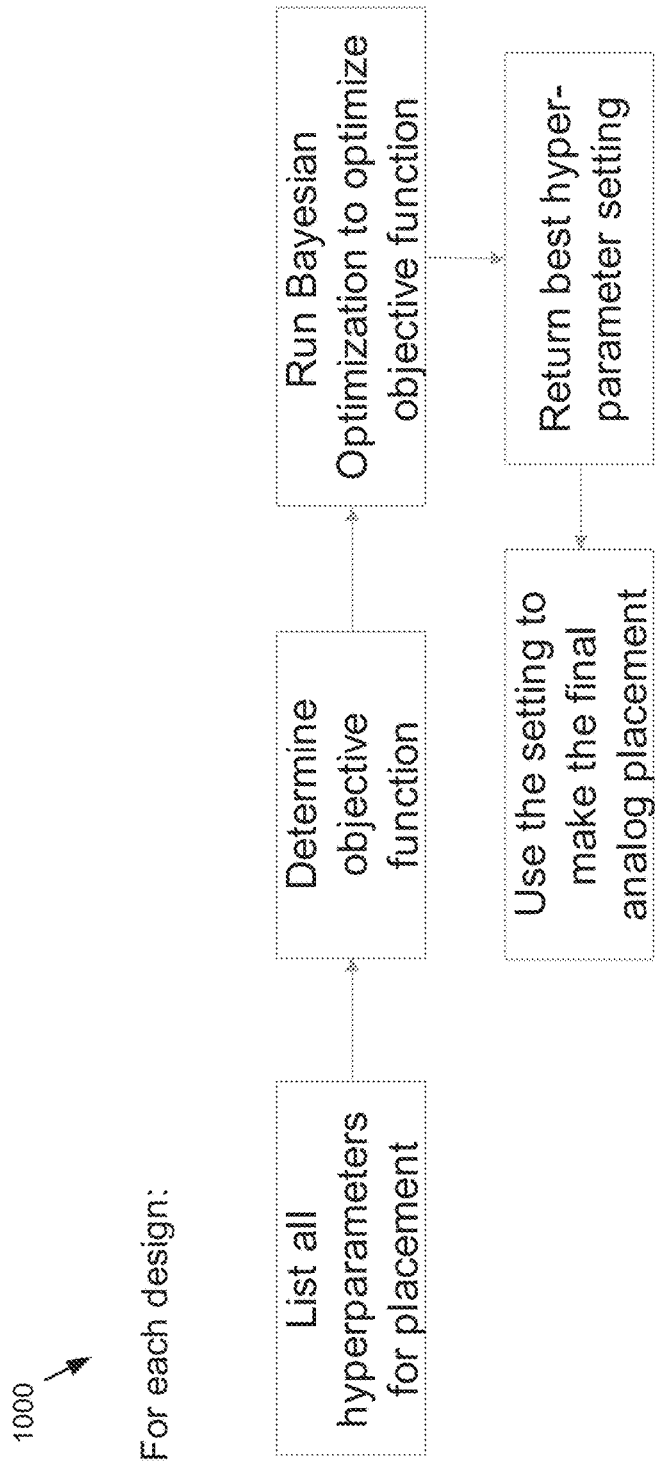
FIG. 10 is a diagram depicting an example Bayesian optimization implementation consistent with the optimization process in accordance with an embodiment of the present disclosure.

Referring now to FIG. 10 an example diagram 1000 showing an example using optimization process 10 in the context of analog placement. In operation, the process may include listing one or more hyper-parameters for analog placement and determining an objective function. The process may run Bayesian optimization to optimize the objective function and return the best or optimal hyper-parameter setting. The setting may then be used to make the final analog placement determination.

It will be apparent to those skilled in the art that various modifications and variations can be made in the embodiments of the present disclosure without departing from the spirit or scope of the present disclosure. Thus, it is intended that embodiments of the present disclosure cover the modifications and variations provided they come within the scope of the appended claims and their equivalents.

What is claimed is:

1. A computer-implemented method for electronic design comprising:
   receiving, using at least one processor, an electronic design;
   determining an objective function associated with the electronic design;
   optimizing the objective function using Bayesian optimization, wherein Bayesian optimization includes automatically selecting a kernel from one or more available kernels of a Gaussian model;
   generating a best hyper-parameter setting based upon, at least in part, the Bayesian optimization; and
   using the best hyper-parameter setting to determine an analog device placement.

2. The computer-implemented method for electronic design of claim 1, wherein selecting is based upon, at least in part, observing a pre-sample fitting performance in the kernel.

3. The computer-implemented method for electronic design of claim 1, further comprising:
   selecting one or more samples from a uniform distribution; and
   applying an expected improvement function to select a potential best sample; and
   evaluating the performance of this potential best sample by applying the objective function and updating the Gaussian model.

4. The computer-implemented method for electronic design of claim 3, further comprising:
   identifying one or more best samples from kernel selection samples and exploration samples to generate one or more exploitation centers.

5. The computer-implemented method for electronic design of claim 4, further comprising:
   defining a Gaussian distribution associated with one or more exploitation centers.

6. The computer-implemented method for electronic design of claim 5, further comprising:
   selecting one or more samples from the Gaussian distribution and using an expected improvement function to suggest one or more samples; and updating the Gaussian model using selected samples; and
obtaining the best hyper-parameter setting among all the samples.

7. The computer-implemented method for electronic design of claim 1, further comprising:
using the best hyper-parameter setting to train a model.

8. A computer-readable storage medium having stored thereon instructions, which when executed by a processor result in one of more operations for electronic design, the operations comprising:
receiving, using at least one processor, an electronic design;
determining an objective function associated with the electronic design;
optimizing the objective function using Bayesian optimization, wherein Bayesian optimization includes automatically selecting a kernel from one or more available kernels of a Gaussian model;
generating a best hyper-parameter setting based upon, at least in part, the Bayesian optimization; and
using the best hyper-parameter setting to determine an analog device placement.

9. The computer-readable storage medium of claim 8, wherein selecting is based upon, at least in part, observing a pre-sample fitting performance in the kernel.

10. The computer-readable storage medium of claim 8, further comprising:
selecting one or more samples from a uniform distribution;
applying an expected improvement function to select a potential best sample; and
evaluating the performance of this sample and update the Gaussian model.

11. The computer-readable storage medium of claim 10, further comprising:
identifying one or more best samples from kernel selection samples and exploration samples to generate one or more exploitation centers.

12. The computer-readable storage medium of claim 11, further comprising:
defining a Gaussian distribution associated with the one or more exploitation centers.

13. The computer-readable storage medium of claim 12, further comprising:
selecting one or more samples from the Gaussian distribution and using an expected improvement function to suggest one or more samples;
updating the Gaussian model using one or more selected samples; and
obtaining the best hyper-parameter setting among all the one or more samples.

14. The computer-readable storage medium of claim 8, further comprising:
using the best hyper-parameter setting to train a model.

15. A computing system including one or more processors and one or more memories configured to perform operations comprising:
receiving, using at least one processor, an electronic design;
determining an objective function associated with the electronic design;
optimizing the objective function using Bayesian optimization, wherein Bayesian optimization includes automatically selecting a kernel from one or more available kernels of a Gaussian model;
generating a best hyper-parameter setting based upon, at least in part, the Bayesian optimization; and
using the best hyper-parameter setting to determine an analog device placement.

* * * * *